(12) United States Patent
Richardson et al.

(10) Patent No.: US 8,521,851 B1
(45) Date of Patent: Aug. 27, 2013

(54) DNS QUERY PROCESSING USING RESOURCE IDENTIFIERS SPECIFYING AN APPLICATION BROKER

(75) Inventors: David R. Richardson, Seattle, WA (US); Bradley E. Marshall, Bainbridge Island, WA (US); Swaminathan Sivasubramanian, Seattle, WA (US); Tal Saraf, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 941 days.

(21) Appl. No.: 12/412,431

(22) Filed: Mar. 27, 2009

(51) Int. Cl.
*G06F 13/00* (2006.01)

(52) U.S. Cl.
USPC .......................................... 709/220

(58) Field of Classification Search
USPC .......................................... 709/203, 220, 239
See application file for complete search history.

(56) References Cited

U.S. PATENT DOCUMENTS

| | | |
|---|---|---|
| 5,341,477 A | 8/1994 | Pitkin et al. |
| 5,611,049 A | 3/1997 | Pitts |
| 5,649,185 A | 7/1997 | Antognini et al. |
| 5,664,106 A | 9/1997 | Caccavale |
| 5,774,660 A | 6/1998 | Brendel et al. |
| 5,819,033 A | 10/1998 | Caccavale |
| 5,892,914 A | 4/1999 | Pitts |
| 5,974,454 A | 10/1999 | Apfel et al. |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |

(Continued)

FOREIGN PATENT DOCUMENTS

| | | |
|---|---|---|
| CN | 1422468 A | 6/2003 |
| CN | 1605182 A | 4/2005 |

(Continued)

OTHER PUBLICATIONS

International Search Report and Written Opinion in PCT/US2011/053302 mailed Nov. 28, 2011 in 11 pages.

(Continued)

*Primary Examiner* — Robert B Harrell
(74) *Attorney, Agent, or Firm* — Knobbe, Martens, Olson & Bear, LLP

(57) ABSTRACT

A system, method and computer-readable medium for request routing based on application information associated with the requested resource are provided. A DNS nameserver at an application broker obtains a DNS query corresponding to a resource requested from a client computing device and associated with a first resource identifier. The first resource identifier includes application information associated with the requested resource. Based on the application information parsed from the first resource identifier, the DNS nameserver at the application broker selects either a second resource identifier which resolves to a domain of a network computing provider or an IP address associated with a network computing component for processing the requested resource. The DNS nameserver then transmits either the second resource identifier or IP address to the client computing device.

38 Claims, 6 Drawing Sheets

(56) References Cited

U.S. PATENT DOCUMENTS

| | | |
|---|---|---|
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,457,047 B1 | 9/2002 | Chandra et al. |
| 6,484,143 B1 | 11/2002 | Swildens et al. |
| 6,505,241 B2 | 1/2003 | Pitts |
| 6,529,953 B1 | 3/2003 | Van Renesse |
| 6,553,413 B1 | 4/2003 | Lewin et al. |
| 6,553,419 B1 | 4/2003 | Ram |
| 6,560,610 B1 | 5/2003 | Eatherton et al. |
| 6,611,873 B1 | 8/2003 | Kanehara |
| 6,633,324 B2 | 10/2003 | Stephens, Jr. |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,698,013 B1 | 2/2004 | Bertero et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,782,398 B1 | 8/2004 | Bahl |
| 6,785,704 B1 | 8/2004 | McCanne |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,874,017 B1 | 3/2005 | Inoue et al. |
| 6,963,850 B1 | 11/2005 | Bezos et al. |
| 6,978,418 B1 | 12/2005 | Bain et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,009,943 B2 | 3/2006 | O'Neil |
| 7,010,578 B1 | 3/2006 | Lewin et al. |
| 7,010,598 B2 | 3/2006 | Sitaraman et al. |
| 7,023,465 B2 | 4/2006 | Stephens, Jr. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,496 B2 | 6/2006 | Subbloie et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,085,825 B1 | 8/2006 | Pishevar et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,107,273 B2 | 9/2006 | Ohata et al. |
| 7,117,262 B2 | 10/2006 | Bai et al. |
| 7,120,871 B1 | 10/2006 | Harrington |
| 7,120,874 B2 | 10/2006 | Shah et al. |
| 7,133,905 B2 | 11/2006 | Dilley et al. |
| 7,139,821 B1 | 11/2006 | Shah et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,657 B1 | 9/2007 | Alexander et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,343,399 B2 | 3/2008 | Hayball et al. |
| 7,363,291 B1 | 4/2008 | Page |
| 7,430,610 B2 | 9/2008 | Pace et al. |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,581,224 B2 | 8/2009 | Romero |
| 7,594,189 B1 | 9/2009 | Walker et al. |
| 7,624,169 B2 | 11/2009 | Lisiecki et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,685,270 B1 | 3/2010 | Vermeulen et al. |
| 7,698,418 B2 | 4/2010 | Shimada et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,748,005 B2 | 6/2010 | Romero et al. |
| 7,752,301 B1 | 7/2010 | Maiocco et al. |
| 7,756,032 B2 | 7/2010 | Feick et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,865,594 B1 | 1/2011 | Baumback et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,456 B2 | 5/2011 | McGrath |
| 7,937,477 B1 | 5/2011 | Day et al. |
| 7,949,779 B2 | 5/2011 | Farber et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,051,166 B1 | 11/2011 | Baumback et al. |

| | | | |
|---|---|---|---|
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,190,682 B2 | 5/2012 | Paterson-Jones et al. |
| 8,321,568 B2 | 11/2012 | Sivasubramanian et al. |
| 8,402,137 B2 | 3/2013 | Sivasubramanian et al. |
| 2001/0000811 A1 | 5/2001 | May et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0116481 A1 | 8/2002 | Lee |
| 2002/0124098 A1 | 9/2002 | Shaw |
| 2002/0129123 A1 | 9/2002 | Johnson et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0188722 A1 | 12/2002 | Banerjee et al. |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0005111 A1 | 1/2003 | Allan |
| 2003/0009591 A1 | 1/2003 | Hayball et al. |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154284 A1 | 8/2003 | Bernardin et al. |
| 2003/0163722 A1 | 8/2003 | Anderson, IV |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0221000 A1 | 11/2003 | Cherkasova et al. |
| 2003/0229682 A1 | 12/2003 | Day |
| 2003/0233423 A1 | 12/2003 | Dilley et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0049579 A1 | 3/2004 | Ims et al. |
| 2004/0059805 A1 | 3/2004 | Dinker et al. |
| 2004/0064293 A1 | 4/2004 | Hamilton et al. |
| 2004/0064501 A1 | 4/2004 | Jan et al. |
| 2004/0064558 A1 | 4/2004 | Miyake |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0038967 A1 | 2/2005 | Umbehocker et al. |
| 2005/0044270 A1 | 2/2005 | Grove et al. |
| 2005/0086645 A1 | 4/2005 | Diao et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0216569 A1 | 9/2005 | Coppola et al. |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0273507 A1 | 12/2005 | Yan et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0063534 A1 | 3/2006 | Kokkonen et al. |
| 2006/0064476 A1 | 3/2006 | Decasper et al. |

| | | |
|---|---|---|
| 2006/0064500 A1 | 3/2006 | Roth et al. |
| 2006/0069808 A1 | 3/2006 | Mitchell et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0112176 A1 | 5/2006 | Liu et al. |
| 2006/0120385 A1 | 6/2006 | Atchison et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0209701 A1 | 9/2006 | Zhang et al. |
| 2006/0218304 A1 | 9/2006 | Mukherjee et al. |
| 2006/0227740 A1 | 10/2006 | McLaughlin et al. |
| 2006/0230137 A1 | 10/2006 | Gare et al. |
| 2006/0233155 A1 | 10/2006 | Srivastava |
| 2006/0251339 A1 | 11/2006 | Gokturk et al. |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0282758 A1 | 12/2006 | Simons et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0016736 A1 | 1/2007 | Takeda et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0055764 A1 | 3/2007 | Dilley et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0245010 A1 | 10/2007 | Arn et al. |
| 2007/0250467 A1 | 10/2007 | Mesnik et al. |
| 2007/0250560 A1 | 10/2007 | Wein et al. |
| 2007/0253377 A1 | 11/2007 | Janneteau et al. |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0086559 A1 | 4/2008 | Davis et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0172488 A1 | 7/2008 | Jawahar et al. |
| 2008/0183721 A1 | 7/2008 | Bhogal et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0122714 A1 | 5/2009 | Kato |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0070603 A1 | 3/2010 | Moss et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |

| | | | |
|---|---|---|---|
| 2010/0121953 | A1 | 5/2010 | Friedman et al. |
| 2010/0122069 | A1 | 5/2010 | Gonion |
| 2010/0125673 | A1 | 5/2010 | Richardson et al. |
| 2010/0125675 | A1 | 5/2010 | Richardson et al. |
| 2010/0150155 | A1 | 6/2010 | Napierala |
| 2010/0192225 | A1 | 7/2010 | Ma et al. |
| 2010/0217801 | A1 | 8/2010 | Leighton et al. |
| 2010/0226372 | A1 | 9/2010 | Watanabe |
| 2010/0257566 | A1 | 10/2010 | Matila |
| 2010/0293479 | A1 | 11/2010 | Rousso et al. |
| 2010/0299439 | A1 | 11/2010 | McCarthy et al. |
| 2010/0332595 | A1 | 12/2010 | Fullagar et al. |
| 2011/0040893 | A1 | 2/2011 | Karaoguz et al. |
| 2011/0078000 | A1 | 3/2011 | Ma et al. |
| 2011/0078230 | A1 | 3/2011 | Sepulveda |
| 2011/0153941 | A1 | 6/2011 | Spatscheck et al. |
| 2011/0238501 | A1 | 9/2011 | Almeida |
| 2011/0238793 | A1 | 9/2011 | Bedare et al. |
| 2011/0252142 | A1 | 10/2011 | Richardson et al. |
| 2011/0252143 | A1 | 10/2011 | Baumback et al. |
| 2011/0258049 | A1 | 10/2011 | Ramer et al. |
| 2011/0276623 | A1 | 11/2011 | Girbal |
| 2012/0066360 | A1 | 3/2012 | Ghosh |
| 2012/0179839 | A1 | 7/2012 | Raciborski et al. |

FOREIGN PATENT DOCUMENTS

| | | |
|---|---|---|
| CN | 101189598 A | 5/2008 |
| CN | 101460907 A | 6/2009 |
| EP | 2008167 | 12/2008 |
| JP | 2003-167810 A | 6/2003 |
| JP | 2003522358 A | 7/2003 |
| WO | WO 2007/007960 A1 | 1/2007 |
| WO | WO 2007/126837 A3 | 11/2007 |
| WO | WO 2012/044587 | 4/2012 |

OTHER PUBLICATIONS

Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Baglioni et al., "Preprocessing and Mining Web Log Data for Web Personalization", LNAI 2829, 2003, pp. 237-249.
Liu et al., "Combined mining of Web server logs and web contents for classifying user navigation patterns and predicting users' future requests," Data & Knowledge Engineering 61 (2007) pp. 304-330.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
Al-Fares, M. et al., A Scalable, Commodity Data Center Network Architecture, SIGCOMM '08 Proceedings, Aug. 17, 2008, pp. 63-74, 66-68, 70-71, Seattle, WA.
Greenberg, A. et al., Networking the Cloud, 29th IEEE International Conference on Distributed Computing Systems (ICDCS 2009), Jun. 22-26, 2009 [online] retrieved from the Internet on Mar. 10, 2011: http://www.cse.ohio-state.edu/icdcs2009/Keynote_files/greenberg-keynote.pdf, pp. 1-45.
Greenberg, A. et al., Towards a Next Generation Data Center Architecture: Scalability and Commoditization, SIGCOMM '08: Proceedings of the 2008 SIGCOMM Conference and Co-Located Workshops NSDR '08, WOSN '08, MOBIARCH '08, NETECON '08, & Presto '08, Seattle, WA, Aug. 17-28, 2008, ACM, Aug. 17, 2008, pp. 57-62, New York, NY.
Greenberg, A. et al., VL2: A scalable and flexible data center network, SIGCOMM '09, Proceedings of the ACM SIGCOMM 2009 Conference on Data Communication, Aug. 17, 2009, vol. 39, Issue 4, pp. 51-62.
Mysore, R.N. et al., Portland: a scalable fault-tolerant layer 2 data center network fabric, SIGCOMM '09, Proceedings of the ACM SIGCOMM 2009 Conference on Data Communication, Aug. 17, 2009, pp. 39-50.

First Office Action in Chinese Application No. 200980119993.1 dated Jul. 4, 2012.
First Office Action in Chinese Application No. 200980119995.0 dated Jul. 6, 2012.
International Preliminary Report on Patentability and Written Opinion in PCT/US2010/060567 mailed on Jun. 19, 2012.
International Preliminary Report on Patentability and Written Opinion in PCT/US2010/060569 mailed Jun. 19, 2012.
International Preliminary Report on Patentability and Written Opinion in PCT/US2010/060573 mailed Jun. 19, 2012.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
International Search Report and Written Opinion in PCT/US2011/061486 mailed Mar. 30, 2012 in 11 pages.
Nilsson et al., IP-Address Lookup Using LC-Tries, IEEE Journalk on Selected Areas of Communication, Jun. 1999, vol. 17, Issue 6, pp. 1083-1092.
Singapore Examination Report in Application No. 201006837-7 mailed May 16, 2012.
Supplementary European Search Report in Application No. 09727694.3 mailed Jan. 30, 2012 in 6 pages.
First Office Action in Chinese Application No. 200980145872.4 dated Nov. 29, 2012.
International Search Report and Written Opinion in PCT/US2010/060567 mailed on Mar. 28, 2012.
Search Report and Written Opinion in Singapore Application No. 201103333-9 mailed Nov. 19, 2012.
Singapore Written Opinion in Application No. 201006836-9, mailed Apr. 30, 2012 in 10 pages.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

Bellovin, S., "Distributed Firewalls," ;login;:37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Byun et al., "A Dynamic Grid Services Deployment Mechanism for On-Demand Resource Provisioning", IEEE International Symposium on Cluster Computing and the Grid:863-870, 2005.

Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al., A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

First Office Action in Chinese Application No. 200980111426.1 mailed Feb. 16, 2013.

Gruener, J., "A Vision of Togetherness," May 24, 2004, NetworkWorld, retrieved May 3, 2006, from, http://www.networkworld.com/supp/2004/ndc3/0524virt.html, 9 pages.

International Preliminary Report on Patentability in PCT/US2007/007601 mailed Sep. 30, 2008 in 8 pages.

International Search Report and Written Opinion in PCT/US07/07601 mailed Jul. 18, 2008 in 11 pages.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kenshi, P., "Help File Library: Iptables Basics," Justlinux, retrieved Dec. 1, 2005, from http://www.justlinux.com/nhf/Security/Iptables_Basics.html, 4 pages.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Office Action in Candian Application No. 2741895 dated Feb. 25, 2013.

Office Action in Japanese Application No. 2011-502138 mailed Feb. 1, 2013.

Office Action in Japanese Application No. 2011-502140 mailed Dec. 7, 2012.

Office Action in Japanese Application No. 2012-052264 mailed Dec. 11, 2012 in 26 pages.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Supplementary European Search Report in Application No. 07754164.7 mailed Dec. 20, 2010 in 7 pages.

Supplementary European Search Report in Application No. 09728756.9 mailed Jan. 8, 2013.

Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.

Virtual Iron Software Home, Virtual Iron, retrieved May 3, 2006, from http://www.virtualiron.com/, 1 page.

Waldspurger, CA., "Spawn: A Distributed Computational Economy," Feb. 1992, IEEE Transactions on Software Engineering, 18(2): 103-117,15 pages.

Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.

Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

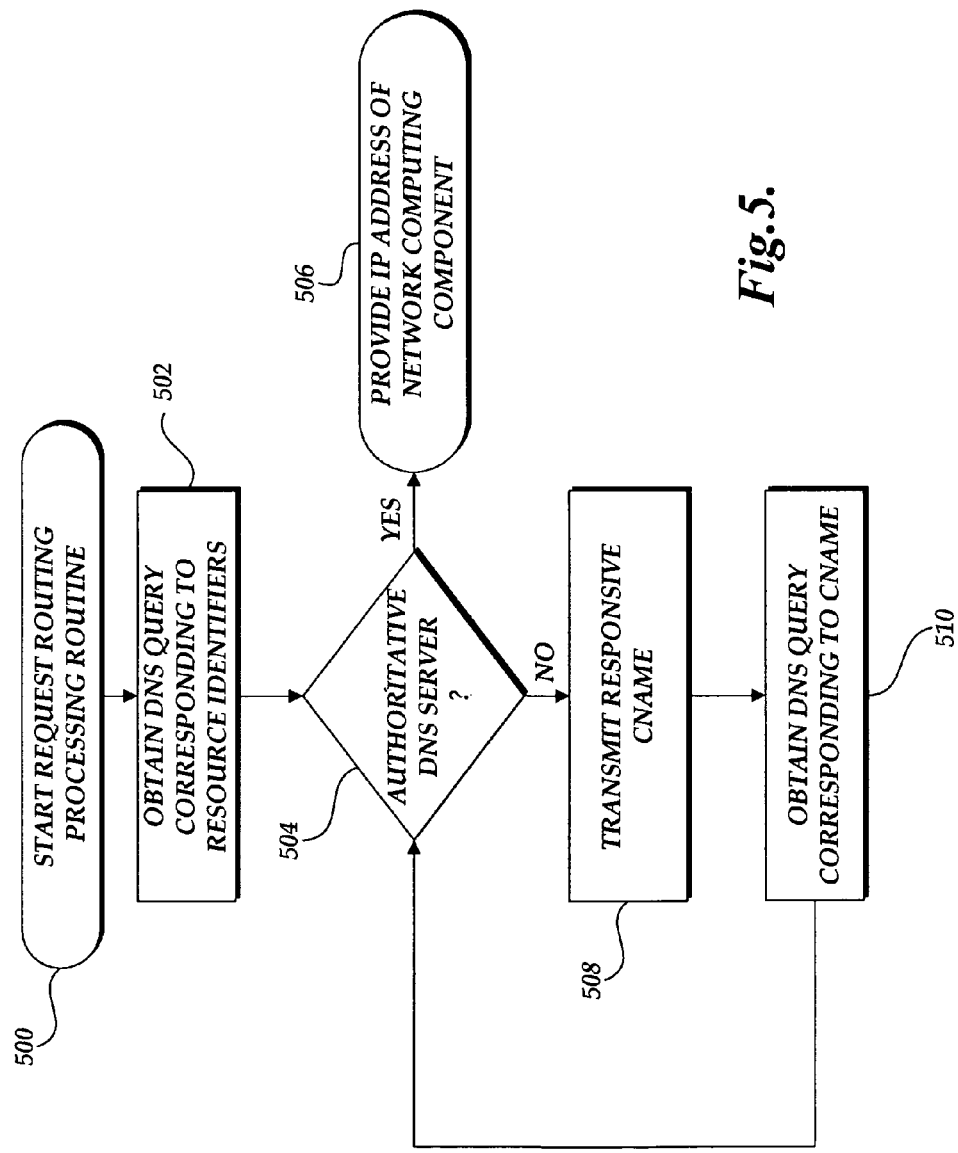

DNS QUERY PROCESSING USING RESOURCE IDENTIFIERS SPECIFYING AN APPLICATION BROKER

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page as well as the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN service provider each typically maintains a number of computing devices in a communication network that can maintain content from various content providers. In turn, content providers can instruct, or otherwise suggest to, client computing devices to request some, or all, of the content provider's content from the network storage provider's or CDN service provider's computing devices. Upon receipt of resource requests from such client computing devices, a CDN service provider also typically delivers the requested resource in accordance with terms (such as via a service plan) specified between a corresponding content provider and the CDN service provider.

With reference to previous illustrative example, the content provider can leverage a network storage provider or CDN service provider with the modification or substitution of resource identifiers associated with the embedded resources. Specifically, the resource identifiers can reference a computing device associated with the network storage provider or CDN service provider such that the client computing device would transmit the request for the additional resources to the referenced network storage provider or CDN service provider computing device. Typically, the content provider facilitates the utilization of a network storage provider or CDN provider by including network storage provider or CDN-provider specific resource identifiers in requested content (e.g., Web pages).

As with content providers, network storage providers and CDN service providers are also generally motivated to provide requested content to client computing devices often with consideration of efficient transmission of the requested content to the client computing device and/or consideration of a cost associated with the transmission of the content. Accordingly, such service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a flow diagram illustrative of a request routing routine implemented by an application broker for selecting a network computing component for processing a resource request.

DETAILED DESCRIPTION

Generally described, the present disclosure is directed to routing of a DNS query from a client computing device to a network computing component via an application broker for processing requested content associated with the DNS query. Specifically, aspects of the disclosure will be described with regard to the routing of a client computing device DNS query as a function of application information associated with resources requested by the client computing device. In certain embodiments, application information may be exclusively included within the resource identifiers utilized in the DNS queries received by the application broker from the client computing device. In other embodiments, the DNS queries may include information that permits the application broker to retrieve application information (or additional application information) associated with the requested resources. In any case, upon determining the application information for the requested resources, the application broker may select network computing components on the basis of this application information to process resource requests from client computing devices. Alternatively, the application broker may select an alternative resource identifier based on the application information. Although various aspects of the disclosure will be described with regard to illustrative examples and embodiments, one skilled in the art will appreciate that the disclosed embodiments and examples should not be construed as limiting.

Figure 1:
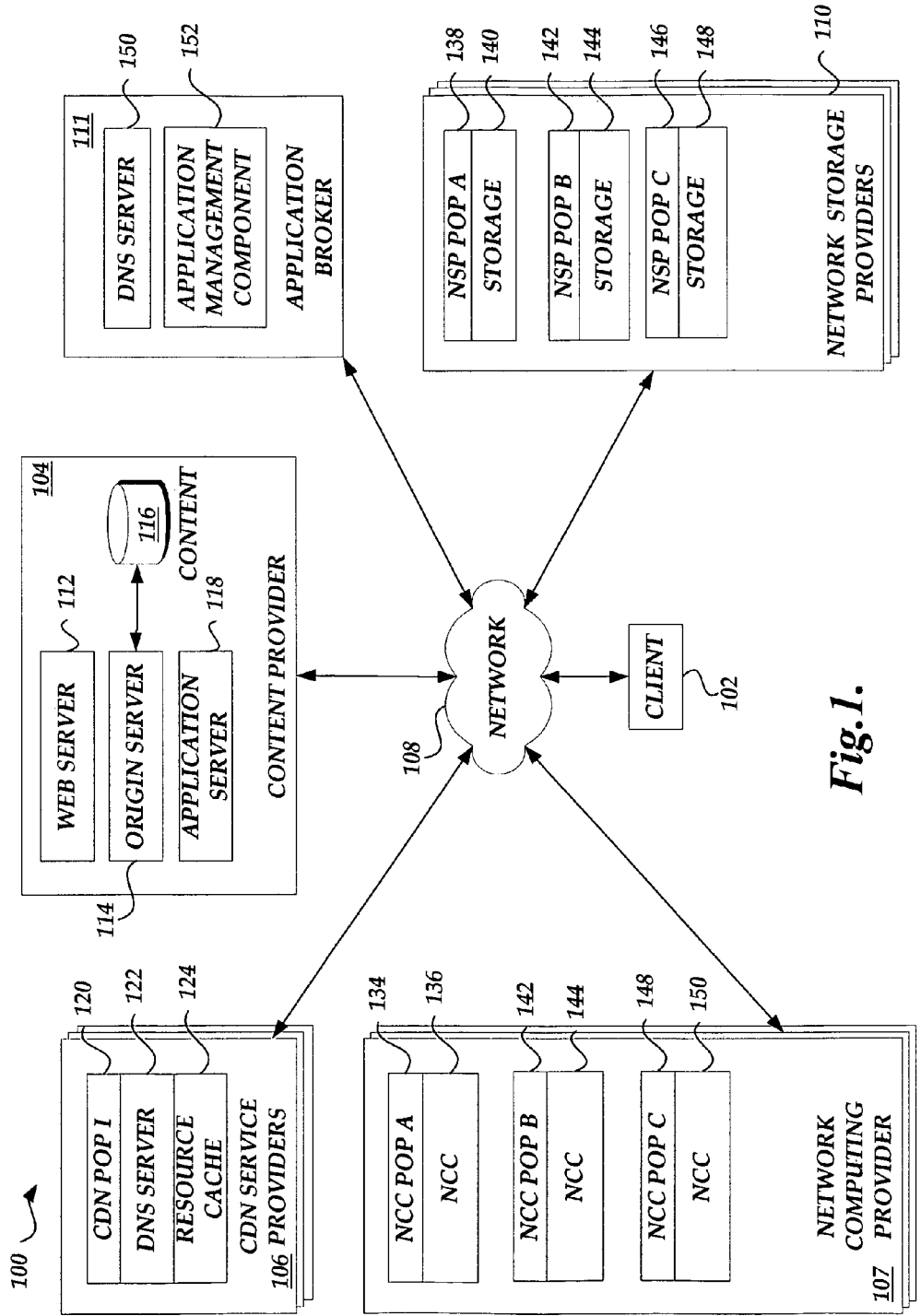
FIG. 1 is a block diagram illustrative of content delivery environment including a number of client computing devices, content provider, a content delivery network service provider, a network storage provider, and a network computing provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider 104, an application broker 111, one or more network storage providers 110, one or more network computing providers, and/or one or more CDN service providers 106. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device 102. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. The content provider 104 can still further include an application server computing device 118, such as a data streaming server for processing streaming content requests.

One skilled in the relevant art will appreciate that the content provider 104 can be associated with various additional computing resources, such additional computing devices for administration of content and resources, DNS nameservers, and the like. For example, although not illustrated in FIG. 1, the content provider 104 can be associated with one or more DNS nameserver components that would be authoritative to resolve client computing device DNS queries corresponding to a domain of the content provider. A DNS nameserver component is considered to be authoritative to a DNS query if the DNS nameserver can completely resolve the query by providing a responsive IP address. Additionally, the content provider 104 may omit some of the components illustrated in FIG. 1, such as the origin server 114.

With continued reference to FIG. 1, the content delivery environment 100 can further include one or more CDN service providers 106 in communication with the one or more client computing devices 102, the content provider 104, the application broker 111, the one or more network storage providers 110, and/or the one or more network computing providers 107 via the communication network 108. Each CDN service provider 106 illustrated in FIG. 1 corresponds to a logical association of one or more computing devices associated with a CDN service provider. Specifically, the CDN service provider 106 can include a number of Point of Presence ("POP") locations 120 that correspond to nodes on the communication network 108. Each CDN POP 120 includes a DNS component 122 made up of a number of DNS server computing devices for resolving DNS queries from the client computers 102. Each CDN POP 120 also includes a resource cache component 124 made up of a number of cache server computing devices for storing resources from content providers and transmitting various requested resources to various client computers. The DNS component 122 and the resource cache component 124 may further include additional software and/or hardware components that facilitate communications including, but not limited to, load balancing or load sharing software/hardware components.

In an illustrative embodiment, the DNS component 122 and resource cache component 124 are considered to be logically grouped, regardless of whether the components, or portions of the components, are physically separate. Additionally, although the CDN POPs 120 are illustrated in FIG. 1 as logically associated with the CDN provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include one or more network computing providers 107 in communication with the one or more client computing devices 102, the CDN service provider 106, the network storage providers 110, the application broker 111 and/or the content provider 104 via the communication network 108. Each network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of a NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 can also include a storage component made up of a number of storage devices for storing resources from content providers which will be processed by an instance of a NCC 136, 144, 150 and transmitted to various client computers. The NCCs 136, 144, 150 may further include additional software and/or hardware components that facilitate communications including, but not limited to, load balancing or load sharing software/hardware components for selecting instances of a virtual machine supporting a requested application and/or providing information to a DNS nameserver to facilitate request routing. Accordingly, reference herein to selection of a NCC (e.g., an IP address associated with a NCC) can include selection of a specific instance of a NCC or selection of load balancing or load sharing component of a NCC which can in turn subsequently select a specific instance of the NCC.

In an illustrative embodiment, NCCs 136, 144, 150 are considered to be logically grouped, regardless of whether the components, or portions of the components, are physically separate. Additionally, although the NCC POPs 134, 142, 148 are illustrated in FIG. 1 as logically associated with the network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, DNS nameservers, and the like. For example, the network computing provider 107 can be associated with one or more DNS nameserver components that are operative to receive DNS queries related to registered domain names associated with the network computing provider 107. The one or more DNS nameservers can be authoritative to resolve client computing device DNS queries corresponding to the registered domain names of the network computing provider 107. As similarly set forth above, a DNS nameserver component is considered to be authoritative to a DNS query if the DNS nameserver can resolve the query by providing a responsive IP address.

With further continued reference to FIG. 1, the content delivery environment 100 can also include one or more network storage providers 110 in communication with the one or more client computing devices 102, the one or more CDN service providers 106, the application broker 111, the one or more network computing providers 107, and/or the content provider 104 via the communication network 108. Each network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142, 146 that correspond to nodes on the communication network 108. Each NSP POP 138, 142, 146 includes a storage component 140, 144, 148 made up of a number of storage devices for storing resources from content providers or content brokers which will be processed by the network storage provider 110 and transmitted to various client computers. The storage components 140, 144, 148 may further include additional software and/or hardware components that facilitate communications including, but not limited to, load balancing or load sharing software/hardware components.

In an illustrative embodiment, the storage components 140, 144, 148 are considered to be logically grouped, regardless of whether the components, or portions of the components, are physically separate. Additionally, although the NSP POPs 138, 142, 146 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such as additional computing devices for administration of content and resources, DNS nameservers, and the like. For example, the network storage provider 110 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. Again, as similarly set forth above, a DNS nameserver component is considered to be authoritative to a DNS query if the DNS nameserver can resolve the query by providing a responsive IP address.

With further continued reference to FIG. 1, the content delivery environment 100 can also include an application broker 111 in communication with the one or more client computing devices 102, the one or more CDN service providers 106, the one or more network storage providers 110, the one or more network computing providers 107, and/or the content provider 104 via the communication network 108. The application broker 111 illustrated in FIG. 1 also corresponds to a logical association of one or more computing devices associated with an application broker. Specifically, the application broker 111 can include an application management ("AM") component 152 for monitoring requests for resources requiring use of an application to provide the resource to the requesting computing device. Additionally, the AM component 152 can be utilized in the process of either selecting a NCC for hosting the application and thereby providing the requested resource or selecting an alternative resource identifier of a domain that may be authoritative to resolve the request.

One skilled in the relevant art will appreciate that the application broker 111 can be associated with various additional computing resources, such additional computing devices for administration of content and resources, DNS nameservers, and the like. For example, as further illustrated in FIG. 1, the application broker 111 can be associated with one or more DNS nameserver components 150 that are operative to receive DNS queries related to registered domain names associated with the application broker 111. As will be further described below, the one or more DNS nameserver components 150 can be authoritative to resolve client computing device DNS queries corresponding to the registered domain names of the application broker 111. Yet again, as similarly set forth above, a DNS nameserver component is considered to be authoritative to a DNS query if the DNS nameserver can resolve the query by providing a responsive IP address.

Even further, one skilled in the relevant art will appreciate that the components of the network storage provider 110, the network computing provider 107, the CDN service provider 106, and the application broker 111 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized.

Figure 2:
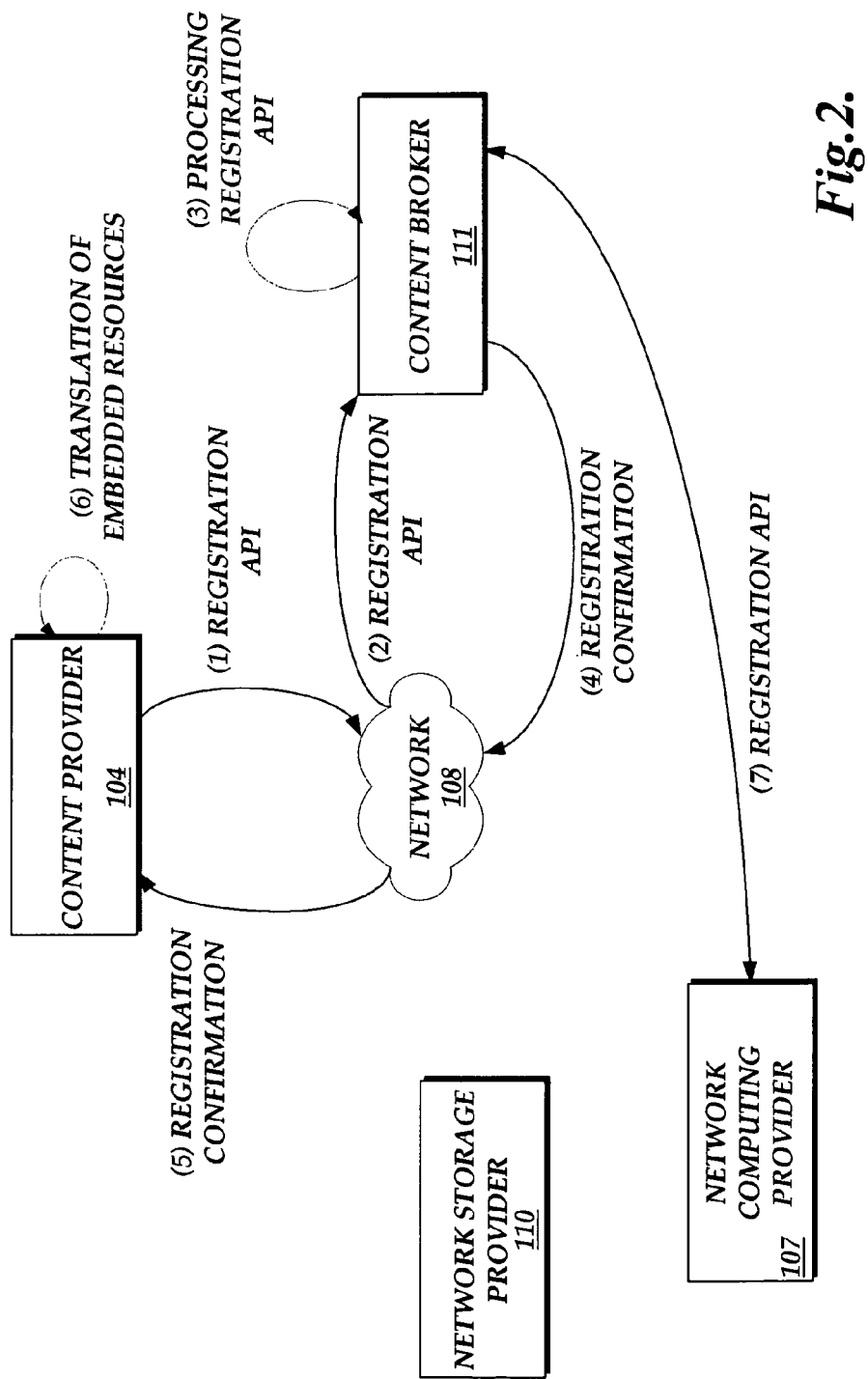
FIG. 2 is a block diagram of the content delivery environment of FIG. 1 illustrating the registration of a content provider with an application broker.
Figure 3A:
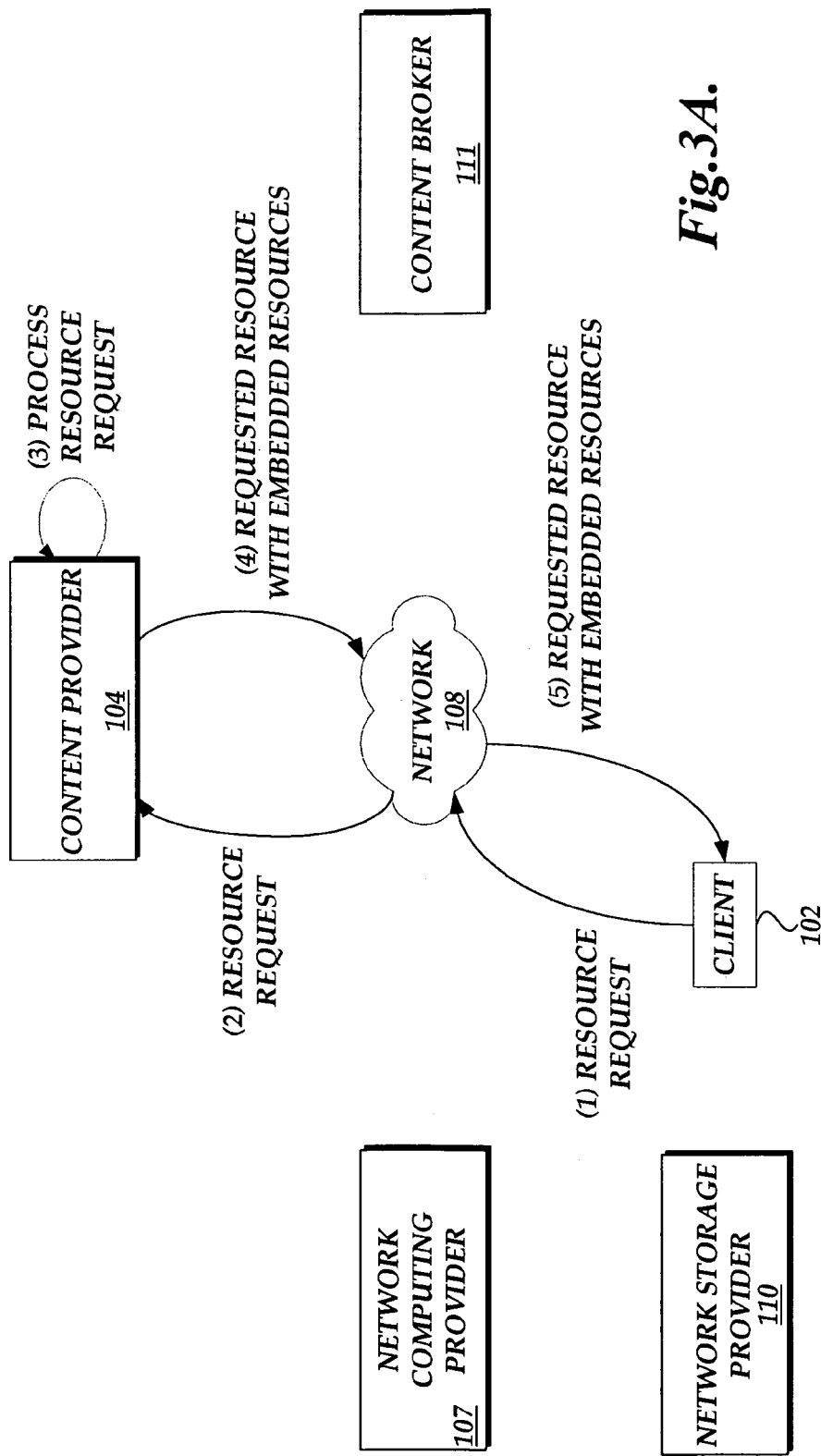
FIG. 3A is a block diagram of the content delivery environment of FIG. 1 illustrating the generation and processing of a content request from a client computing device to a content provider.
Figure 3B:
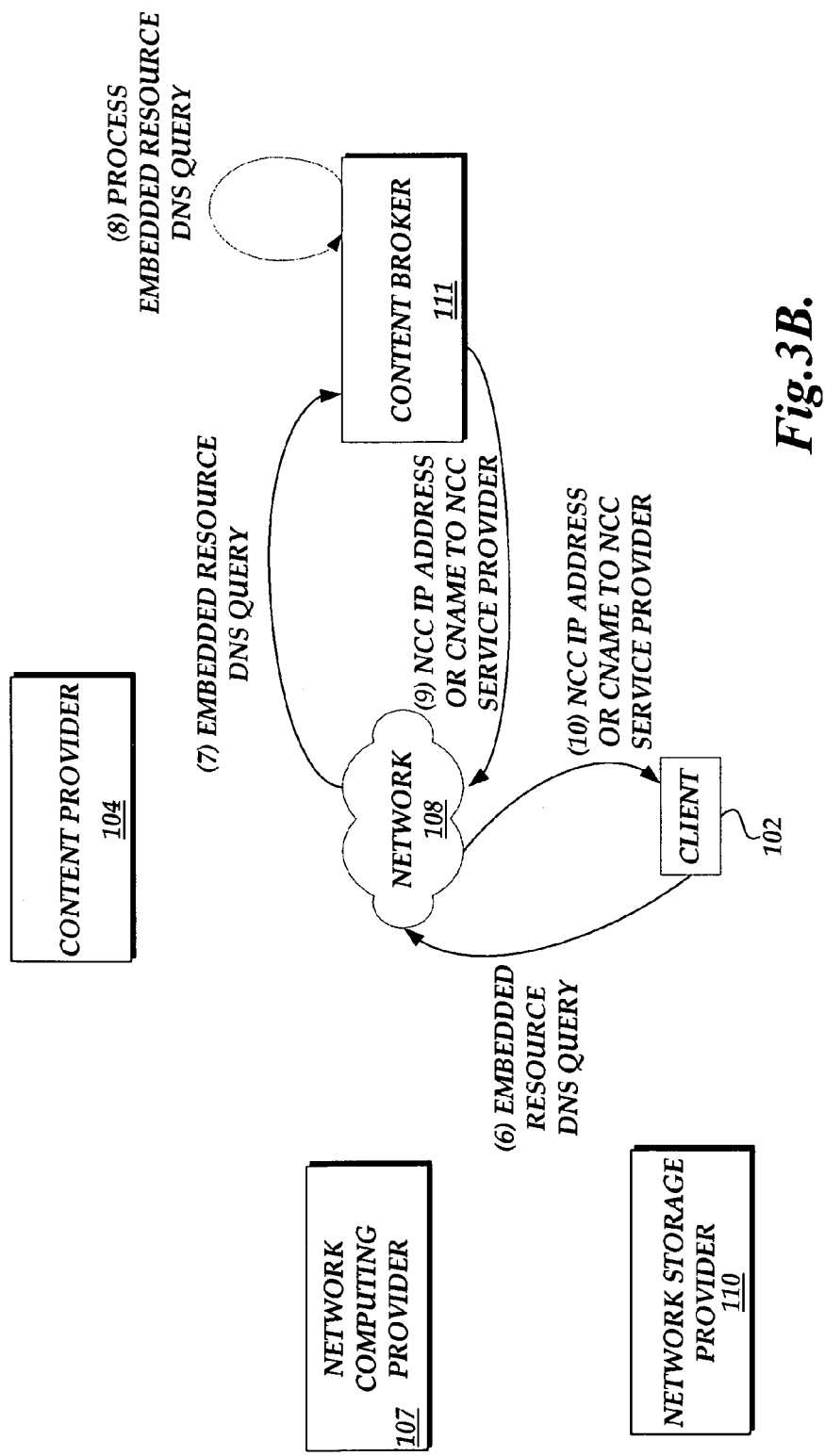
FIG. 3B is a block diagram of the content delivery environment of FIG. 1 illustrating one embodiment of the generation and processing of a DNS query corresponding to an embedded resource from a client computing device to an application broker.
Figure 4:
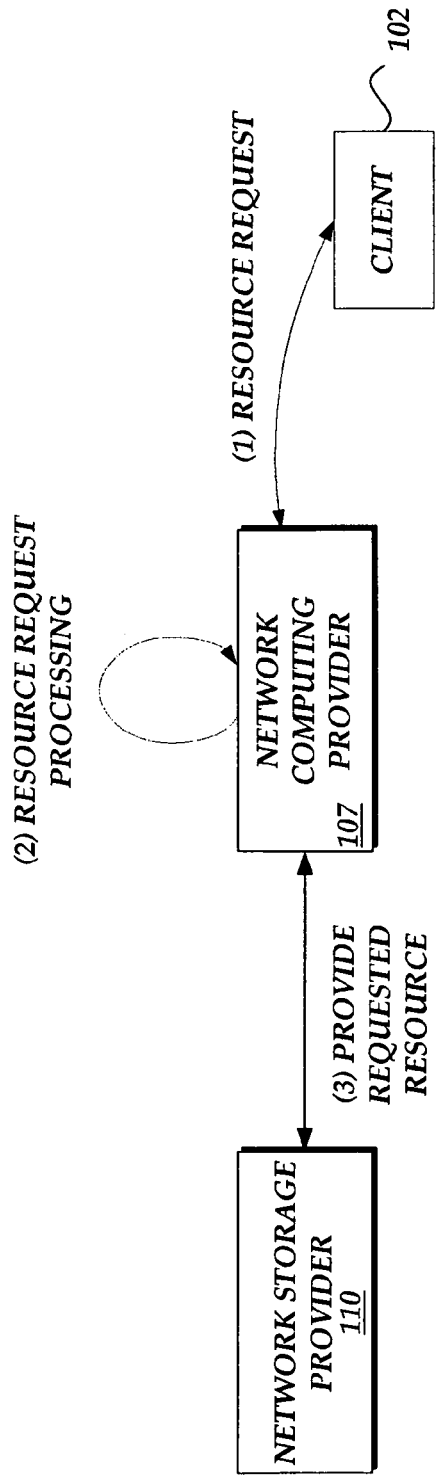
FIG. 4 is a block diagram of the content delivery environment of FIG. 1 illustrating the generation and processing of an embedded resource request from a client computing device to a network computing provider.

With reference now to FIGS. 2-4, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, an illustrative interaction for registration of a content provider 104 with the application broker 111 will be described. As illustrated in FIG. 2, the application broker registration process begins with registration of the content provider 104 with the application broker 111. In an illustrative embodiment, the content provider 104 utilizes a registration application program interface ("API") to register with the application broker 111 such that the application broker 111 can facilitate use of one or more NCCs of one or more network computing providers 107 to provide content utilizing an application on behalf of the content provider 104. The registration API can include the identification of the origin server 114 of the content provider 104 that will provide requested resources to a selected NCC of a network computing provider. In another embodiment, the content provider 104 and/or the application broker 111 may facilitate using a network storage provider 110 as an origin server for the content provider 104. Additionally, the registration API can further facilitate the specification of service levels, financial cost criteria, or other content provider specified criteria that can be utilized by the application broker 111 in request routing processing.

One skilled in the relevant art will appreciate that upon registration of content with the application broker 111, the content provider 104 can begin to direct requests for content from client computing devices 102 to the application broker 111. Specifically, in accordance with DNS routing principles, and as will be described in further detail below, a client computing device request corresponding to a resource identifier would eventually be directed toward a NCC 136, 144, 150 associated with a network computing provider 107.

With continued reference to FIG. 2, upon receiving the registration API, the application broker 111 obtains and processes the content provider registration information. In an illustrative embodiment, the application broker 111 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. In another embodiment, the additional information can include file type identifiers and/or application identifiers which can include file type information, as well as information pertaining to a type of application for processing the requested content or a specific instance of an application desired for processing the requested content. Application identifiers may also include or be associated with other additional information or requirements for selecting an instance of an application for processing the requested content, such as quality of service criteria which can include information as to compression rates, processing power, processing speed, and/or bandwidth of the NCC, and the like. One skilled in the relevant art will appreciate that various types of additional information may be generated by the application broker 111 and that the additional information may be embodied in any one of a variety of formats.

In one embodiment, the application broker 111 returns an identification of applicable domains for the application broker (unless it has been previously provided) and any additional information to the content provider 104. In turn, the content provider 104 can then process the stored content with the application broker specified information. In one example, as illustrated in FIG. 2, the content provider 104 modifies resource identifiers originally directed toward a domain of the origin server 114 to a domain corresponding to the application broker 111. The modified URLs are embedded into requested content in a manner such that DNS queries for the modified URLs will resolve to a DNS server corresponding to the application broker 111 and not a DNS server corresponding to the content provider 104. Although the modification process is illustrated in FIG. 2, in some embodiments, the modification process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative modification process, the content provider URL is modified such that requests for the resources associated with the modified URLs resolve to the application broker 111. In one embodiment, the modified URL identifies the domain of the application broker 111 (e.g., "applicationbroker.com"), the same name of the resource to be requested (e.g., "resource.xxx") and the same path where the resource will be found (e.g., "path"). Additionally, the modified URL can include various additional pieces of information utilized by the application broker 111 during the request routing process. Specifically, in an illustrative embodiment, the modified URL can include an application identifier and/or data otherwise corresponding to application information or criteria utilized by the application broker 111 during the request routing process (hereinafter collectively referred to as "application information"). Accordingly, as similarly described above, the application information can include, but is not limited to, client identifiers, content provider identifiers, file type identifiers, application identifiers, and the like. In one example, the application information can correspond to a file type identifier that can thereafter be used by the application broker 111, such as via a lookup, to determine information regarding an application for use in processing the requested resource.

In a further illustrative embodiment, the application broker 111 can use the application information from the URL alone or together with yet other additional information or requirements for use in selecting an instance of an application for processing requested content or selecting a domain of a network computing provider that may be authoritative to resolve the resource request. One skilled in the relevant art will appreciate that the name information and the path information is not accessible to a DNS nameserver as a part of DNS query processing. The portion of the URL including the domain and any preceding information, on the other hand, is generally referred to as the "DNS portion" of the URL.

Additionally, the modified URL can include any additional processing information (e.g., "additional information") utilized by the application broker 111 during the request routing, including, but not limited to, content provider IDs, service plan information, file identifiers, and the like. For example, where the application information corresponds to an application identifier, the additional information may include a file identifier or service plan information. The modified URL would have the form of:

http://additional_information.application_information.applicationbroker.com/path/resource.xxx In another embodiment, the information associated with the application broker 111 is included in a modified URL, such as through prepending or other techniques, such that the modified URL can maintain all of the information associated with the original URL. In this embodiment, the modified URL would have the form of:

http://additional_information.application_information.applicationbroker.com/www.contentprovider.com/path/resource.xxx In both of the above examples, the application information and the additional information are separated as separate labels in the modified URL. One skilled in the relevant art will appreciate that the application information and any additional information can be combined together in a single label of the modified URL. It will also be appreciated by one skilled in the relevant art that, rather than including the additional application information in the modified URL, the additional application information may be otherwise made available to the application broker and/or any DNS server in the routing process.

With reference now to FIG. 3A, after completion of the registration and resource identifier modification processes illustrated in FIG. 2, a client computing device 102 subsequently generates a content request that is received and processed by the content provider 104, such as through the Web server 112. In accordance with an illustrative embodiment, the request for content can be in accordance with common network protocols, such as the hypertext transfer protocol ("HTTP").

Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), of a DNS query for the original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS nameserver authoritative to the ".applicationbroker" portion of the embedded URL. The issuance of DNS queries corresponding to the "." and the "com" portions of a URL are well known and have not been illustrated.

With reference now to FIG. 3B, in an illustrative embodiment, the identification of a DNS nameserver authoritative to the "applicationbroker" portion of the original URL identifies a network address, such as an IP address, of a DNS nameserver associated with the application broker 111. In one embodiment, the IP address is a specific network address unique to a DNS nameserver component of the application broker 111. In another embodiment, the IP address can be shared by one or more components of the application broker 111. In this embodiment, a further DNS query to the shared IP address utilizes a one-to-many network routing schema, such as anycast, such that a specific component of the application broker 111 will receive the request as a function of network topology. For example, in an anycast implementation, a DNS query issued by a client computing device 102 to a shared IP address will arrive at a DNS nameserver component of the application broker 111 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and an application broker component. It will be appreciated by one skilled in the relevant art than a number of ways exist to determine network topology distance.

With continued reference to FIG. 3B, a specific DNS nameserver 150 of the application broker 111 receives the DNS query corresponding to the original URL from the client computing device 102. Once one of the DNS nameservers in the application broker 111 receives the request, the specific DNS nameserver attempts to resolve the request. The one or more DNS nameservers of the application broker 111 can be authoritative to resolve client computing device DNS queries corresponding to the registered domain names of the application broker 111. As similarly set forth above, a DNS nameserver is considered to be authoritative to a DNS query if the DNS nameserver can resolve the query by providing a responsive IP address. Accordingly, in one illustrative embodiment, as shown in FIG. 3B, a specific DNS nameserver of the application broker 111 can resolve the DNS query by identifying an IP address of a NCC of a network computing provider 107 that will further process the request for the requested resource.

As will be described further below, in one embodiment, the application broker 111 utilizes application information, at least in part, to identify the particular instance of a NCC (and its associated IP address). In one illustrative embodiment, the application broker 111 can use the application information and any additional information in the DNS portion of the resource identifier (which is used to resolve the DNS query), or otherwise determined by the application broker 111, to return an IP address of an instance of a NCC. As similarly described above, the application information can include, without limitation, an application identifier including information pertaining to a type of hosted application for processing the requested content or a specific instance of a hosted application desired for processing the requested content, file type identifiers which can include file type information for use by the application broker in determining the appropriate type or instance of a hosted application for processing the requested content, or other client or content provider identification codes which can be used by the application broker in determining the appropriate type or instance of a hosted application for processing the requested content, and the like.

In one example, as will be further described below, where the requested content corresponds to a streaming media file, for example, the application broker 111 can use application information included in a DNS portion of the first resource identifier to select an instance of a NCC for processing the streaming media file. In one embodiment, the application information can specify file type information for the content to be processed, and the application broker 111 selects an instance of a NCC that has a data streaming application capable of processing a request for the identified file type, e.g., an MPEG or Flash media file. In another embodiment, the application information can specify a type of hosted application, e.g., an Adobe Flash server streaming application or a Real Network Helix server streaming application, to be used to process the requested content. Based on that information, the application broker 111 resolves the DNS query by identifying an instance of a NCC that corresponds to the identified type of application for processing the requested content or that can dynamically cause creation of such an instance. Still further, in another embodiment, the application information can specify a specific instance of an application, e.g., Company's Flash server, specified by a content provider for example. Based on that information, the application broker 111 then resolves the DNS query by identifying the IP address of a specific instance of a NCC that has the application required to process the requested content. Yet further, in another embodiment, the DNS portion of the first resource identifier can have a separate file type identifier which provides the file type information for use by the application broker 111 in selecting an appropriate instance of a NCC device for servicing the requested content.

Even further, the application broker 111 can also use information obtained directly from a client computing device (such as information provided by the client computing device or ISP) or indirectly (such as inferred through a client computing device's IP address) to determine an instance of a NCC. Such client computing device information can, for example, be geographic information. As will be described further below, this client computing device information together with the application information can be used to select an instance of a NCC as a function of the client computing device location. For example, in order to reduce latency and improve performance, the application broker 111 may select an instance of a NCC close to the requesting client computing device for processing a content request such as one requiring use of a streaming media application. The IP address selected by a DNS nameserver component of the application broker 111 may correspond to a specific instance of a NCC. Alternatively, the IP address can correspond to a hardware/software selection component (such as a load balancer) at a specific NCC POP for selecting a specific instance of a NCC.

Still further, for selection of an instance of a NCC, the application broker 111 can utilize additional selection information provided in the DNS portion of the resource identifier (which is used to resolve the DNS query) and/or from network computing provider 107 to the application broker 111. It will also be appreciated that the additional selection information may also be otherwise determined and/or maintained by the application broker 111. Such selection information can include information typically related to quality of service, such as computing capacity measurements of NCCs, compression rates, processing power, processing speed, bandwidth, and the like, which can be indirectly related to the cost associated with creating and/or using a particular instance of a NCC. In one embodiment, this additional selection information can be provided over a communication channel between the network computing provider 107 and the application broker 111, as generally illustrated in FIG. 2, at a variety of times. Moreover, as will be appreciated by one skilled in the relevant art, the additional selection information may be transmitted in any of a number of ways, such as upon individual requests from the application broker 111, batch processing initiated by the application broker 111 or network computing provider 107, and the like.

Continuing with reference to FIG. 3B, as an alternative to selecting a NCC upon receipt of a DNS query as described above, the application broker 111 can maintain sets of various alternative resource identifiers which correspond to DNS nameserver components associated with a NCC and which are based on prior network computing provider registration information. In this embodiment, the application broker 111 utilizes and/or obtains the application information and any additional information, as similarly set forth above, to select an alternative resource identifier. The selected alternative resource identifier can be provided by the application broker 111 to the client computing device 102 such that a subsequent DNS query on the alternative resource identifier will be processed by a DNS nameserver component within the network computing provider's network. In this embodiment, a DNS nameserver associated with the application broker 111 (directly or indirectly) is able to receive the DNS query (corresponding to the domain in the embedded resource). However, as discussed above, because the DNS nameserver does not provide a responsive IP address to the query, it is not considered authoritative to the DNS query. Instead, in this embodiment, the application broker 111 selects (or otherwise obtains) an alternative resource identifier that is intended to resolve to an appropriate DNS nameserver of a network computing provider based, at least in part, on the application information associated with the requested resource and as will be described further below. As will also be described further below, the application information and any additional information may also be used for further request routing.

In an illustrative embodiment, the alternative resource identifiers are in the form of one or more canonical name ("CNAME") records. In one embodiment, each CNAME record identifies a domain of the network computing provider (e.g., "computingprovider.com" or "computingprovider-1.com"). As will be explained in greater detail below, the domain in the CNAME does not need to be the same domain found in original URL or in a previous CNAME record. In a manner similar to the information described above, each CNAME record includes the same or different application and/or additional information utilized by a receiving DNS nameserver for processing the DNS query.

In an illustrative embodiment, the application information included in the CNAME can be the same application information provided in the modified URL or additional/alternative application information obtained by the application broker 111. For example, the application information included in the CNAME can correspond to application information otherwise obtained by the application broker (directly or indirectly). As also described above, the CNAME can also include additional request routing information, (e.g., "request routing information") utilized by the application broker 111. An illustrative CNAME record can have the form of:

http://additional_information.application_information.applicationbroker.com/path/resources.xxxCNAMErequest_routing_information.application_information.computingprovider.com In an illustrative embodiment, the CNAME records are generated and provided by the one or more DNS servers of the application broker 111 to direct a more appropriate DNS nameserver (or group of DNS nameservers) of a network computing provider, such as the network computing provider 107. As used in accordance with the present disclosure, appropriateness can be defined in any manner by the application broker 111 for a variety of purposes.

In the embodiment illustrated in FIG. 3B, the application broker 111 utilizes the application information, at least in part, to identify the more appropriate DNS nameserver (or group of DNS nameservers) of the network computing provider 107 or resolve the DNS query by identifying a NCC (e.g., an IP address of either a specific instance of a NCC or a load balancing or load sharing component of a NCC). Moreover, subsequently selected DNS nameservers of the network computing provider 107 may similarly utilize the same or different application information to resolve subsequently received DNS queries to identify an instance of a NCC. As described above, for any of the foregoing embodiments, the application information may be defined in a variety of ways. Additionally, although such application information can be used by different components and in different stages of the request routing process, the following section will describe how application information is used primarily with respect to the application broker 111 resolving a DNS query by providing an IP address of a NCC as a function of the application information. However, one skilled in the art and others will appreciate that other components and stages in the request routing process may similarly use such application information.

In one example, the application broker 111 may determine that requests for resources utilizing applications which receive more data from a client computing device than delivered to the client computing device should be handled by one or more NCCs positioned relatively close to the client computing device 102. One or more NCCs may be positioned at the edges of the communications network to which the client computing devices 102 are connected. Depending upon the location of a client computing device 102, some NCCs may be closer to the client computing device than others. In this context, closeness may include, but is not limited to, geographical proximity, network topology, and the like. Accordingly, the application broker 111 resolves the DNS query by selecting one or more NCCs of a network computing provider 107 closer to the client computing device 102. Accordingly, for applications which receive more data from clients than delivered out, utilizing applications at NCCs close to the clients can result in reduced latency and higher service quality. These types of applications are considered data sinks. Accordingly, in this embodiment, by providing a hosting environment for such applications that allow data from the client to be received faster through the selection of one or more NCCs close to the client computing device, overall performance can be improved.

In another example, the application broker 111 may determine that requests for resources utilizing applications which deliver more data to a client computing device than received by the application from the client computing device and which are computationally intensive should also be handled by one or more NCCs positioned relatively close to the client computing device 102. In this context, computational intensity can correspond to applications having a high processing to data source access ratio, e.g., a ratio greater than 1 or exceeding some other threshold value. By moving data delivery and processing of these types of applications closer to the client computing device, and thus the edge of the network, through selection of appropriate NCCs, the application broker 111 can distribute requests to NCCs having a higher resource availability. Accordingly, latency due to insufficient computing resources may be reduced.

In a further example, the application broker 111 may determine that requests for resources utilizing applications which are less computationally intensive and more database intensive should alternatively be handled by one or more NCCs that are close to the data source. In this context, these types of applications can correspond to applications having a processing to data source access ratio that fails to exceed a threshold, e.g., those resulting in a ratio of less than or equal to 1. Additionally, closeness may again include, but is not limited to, geographical proximity, network topology, and the like. In these instances, the application broker 111 resolves the DNS query by selecting one or more NCCs that are close to the data source. The data source may correspond, for example, to the origin server component 114 and associated storage component 116 of the content provider 104 or to a third party storage component used on behalf of the content provider 104, such as storage components 140, 144, 148 of network storage provider 110. As a result of routing this type of application in such a manner, the application broker 111 facilitates higher service quality and reduced latency in the request routing process.

As described above, in addition to the consideration of application information, the application broker 111 and/or subsequent processing components, such as components at the network computing provider 107, can utilize additional information (e.g., the "additional information") included in the modified URL, or otherwise determined, to select a more appropriate NCC. In one aspect, the application broker 111 can utilize the additional information to select from a set of DNS nameservers identified as satisfying routing criteria including, but not limited to, financial cost to content provider 104, network performance (e.g., "internet weather"), service level criteria, resource popularity, application availability, data availability, observed behavior, etc. In another aspect, the application broker 111 can utilize the additional information to validate the NCC selected in accordance with the application information or to select an alternative DNS nameserver (or group of DNS nameservers) previously selected in accordance with the application information. In still another aspect, the application broker 111 can utilize the additional information to select a set of potentially applicable NCCs (e.g., meeting minimum service levels) and then utilize the application information to prioritize from the set of potentially applicable NCCs.

In one example, the application broker 111 can additionally attempt to direct a DNS query to DNS nameservers or resolve the DNS query to a NCC according to network performance criteria. The network performance criteria can correspond to measurements of network performance for transmitting data from the network computing provider NCCs to the client computing device 102. Examples of network performance metrics can include network data transfer latencies (measured by the client computing device or the application broker 111, network data error rates, and the like.

In another example, the application broker 111 can additionally attempt to direct a DNS query to a DNS nameserver associated with a network computing provider or resolve the DNS query to a NCC according to service level criteria. The service level criteria can correspond to service or performance metrics contracted between the application broker 111 and the content provider 104. Examples of performance metrics can include latencies of data transmission between the network computing provider's POPs and the client computing devices 102, total data provided on behalf of the content provider 104 by the network computing provider's POPs, error rates for data transmissions, and the like.

In yet another example, the application broker 111 can additionally attempt to direct a DNS query to a DNS nameserver associated with a network computing provider or resolve the DNS query to a NCC according to observed behaviors. In particular, the application broker 111 can monitor past performance of the network computing provider 107 and/or NCCs of the network computing provider 107 to determine whether modifications should be made in the routing of future resource requests. It will be appreciated by one skilled in the relevant art that a variety of logic may be implemented to monitor such behavior and to update routing information based thereon.

In yet another example, the application broker 111 can attempt to direct a DNS query to a DNS nameserver associated with a network computing provider or resolve the DNS query to a NCC according to selection information criteria provided by the network computing provider 107. As similarly set forth above, such selection information can include information typically related to quality of service, such as computing capacity measurements of NCCs, compression rates, processing power, processing speed, bandwidth, and the like, which can be indirectly related to the cost associated with creating and/or using a particular instance of a NCC. This selection information can be provided over a communication channel between the network computing provider 107 and the application broker 111 at a variety of times. Moreover, as will be appreciated by one skilled in the relevant art, the selection information may be transmitted in any of a number of ways, such as upon individual requests from the application broker 111, batch processing initiated by the application broker or network computing provider, and the like.

In still another example, the application broker 111 can additionally attempt to direct a DNS query to a DNS server associated with a network computing provider or resolve the DNS query to a NCC according to cost information. The cost information can correspond to a financial cost attributable to the content provider 104 for the delivery of resources by the network computing provider 107. The financial cost may be defined in a variety of ways and can be obtained by the AM component 152 of the application broker 111, or by a management component of the network computing provider, in a variety of ways.

In another embodiment, the cost information may designate that the content provider 104 has requested that the AM component 152 of the application broker 111 select the NCC associated with the lowest current financial cost to provide the requested resource. Accordingly, the AM component 152 of the application broker 111 could obtain cost information for at least a portion of the NCCs and select the NCC of the network computing provider associated with the lowest financial cost. The financial cost information utilized to select the lowest financial costs may be based on a current financial costs or projected financial costs. The projected financial costs can be based on criteria, such as time of day, characteristics of the resource (e.g., size of the data, type of data, type of application required to provide the data, etc.), anticipated data throughput volumes, current loads experienced by each NCC, and the like. For example, if a network computing provider's NCC resources are at an optimal capacity, the network computing provider may project financial cost at a premium cost level (e.g., a highest cost level) because any additional data traffic would cause the resources to operate above optimal rates. Conversely, the network computing provider 107 may project lower financial costs for specific NCCs according to historically known low volume times (e.g., time of day, days of the month, time of the year, special days/holidays, etc.). The financial cost information may be a single cost projected for each identifiable network computing provider. Alternatively, the financial cost information may be a set of costs associated with one or more identifiable components of each network computing provider (e.g., financial information for one or more NCCs associated with a network computing provider).

In yet another embodiment, the cost information may designate that the content provider 104 has requested that the cost associated with providing the requested resource be maintained below one or more cost thresholds or cost tiers. Accordingly, the AM component 152 of the application broker 111 could obtain financial cost information for the available NCCs and select only those NCCs with a financial cost at or below the cost thresholds. The AM component 152 of the application broker 111 could then utilize other request routing criteria to select from the selected DNS nameservers (if more than one DNS nameserver is identified) or selected in accordance with other selections methodologies (e.g., random, round robin, etc.).

In still another embodiment, the AM component 152 of the application broker 111 can utilize a determined/projected volume of request information for selecting a network computing provider, a specific DNS nameserver associated with one or more NCCs of the network computing provider, and/or a NCC of a specific provider (such as the network computing provider 107 or any other provider providing NCCs). The determined/projected volume of request information can include the total number of requests obtained by the application broker 111 for a resource over a defined period of time, trends regarding an increase/decrease in requests for the resource, and various combinations or alternatives thereof.

In a yet further embodiment, the AM component 152 of the application broker 111 can additionally utilize other content provider specified criteria for selecting a domain associated with a network computing provider and/or a specific NCC of a network computing provider. The content provider specified criteria can correspond to a variety of measurements or metrics specified by the content provider 104 and related to the delivery of resources on behalf of the content provider. The measurements or metrics can include content provider specified quality metrics (e.g., error rates), user complaints or error reports, and the like.

In accordance with a specific illustrative embodiment regarding selection of a domain of a network computing provider, the application broker 111 maintains a data store that defines CNAME records for various URLs corresponding to embedded resources. If a DNS query corresponding to a particular URL matches an entry in the data store, the application broker 111 returns a CNAME record to the client computing device 102 as defined in the data store and as illustrated in FIG. 3B. In an illustrative embodiment, the data store can include multiple CNAME records corresponding to a particular original URL. The multiple CNAME records would define a set of potential candidates that can be returned to the client computing device. In such an embodiment, the DNS nameserver of the application broker 111, either directly or via a network-based service, can implement additional logic, such as described above, in selecting an appropriate CNAME from a set of possible of CNAMEs.

As similarly described above, the returned CNAME can also include request routing information that is different from or in addition to the information provided in the URL/CNAME of the current DNS query. For example, if the CNAME selection is based on a service level plan selected by the content provider 104, a specific identifier associated with the selected service level plan can be included in the "request_routing_information" portion of the specific CNAME record. In another embodiment, request routing information can be found in the identification of a network computing provider domain different from the domain found in the original URL. For example, if the CNAME is based on a service level plan, a specific service level plan domain (e.g., "networkcomputingprovider-servicelevel1.com") could be used in the domain name portion of the specific CNAME record. Any additional request routing information can be prepended to the existing request routing information in the current URL/CNAME such that the previous request routing information would not be lost (e.g., http://serviceplan.networkcomputingprovider.com). One skilled in the relevant art will appreciate that additional or alternative techniques and/or combination of techniques may be used to include the additional request routing information in the CNAME record that is selected by the application broker 111.

With reference now to FIG. 4, assume that the DNS application broker 111 has resolved the DNS query by returning the IP address of an instance of NCC 136 of NCC POP 134. Upon receipt of the IP address for the instance of NCC 136, the client computing device 102 transmits a request for the requested content to the instance of NCC 136 at the network computing provider 107. The instance of NCC 136 processes the request and the requested content obtained by NCC 136 from the network storage provider 110, for example, is then transmitted to the client computing device 102. For example, for streaming media, the instance of the NCC will begin streaming the content.

With reference now to FIG. 5, a request routine 500 implemented by the application broker 111, and by the network computing provider 107 in some embodiments, will be described. For brevity, routine 500 will be discussed further below solely with respect to the application broker 111. However, one skilled in the art and others will appreciate that routine 500 may similarly be performed by the network service provider 107 as well.

In the present illustrative embodiment, one skilled in the relevant art will also appreciate that actions/steps outlined for routine 500 may be implemented by one or many computing devices/components that are associated with the application broker 111. Accordingly, routine 500 has been logically associated as being performed by the application broker 111.

At block 502, one of the DNS nameserver components of the application broker 111 receives a DNS query corresponding to a resource identifier (the "receiving DNS nameserver). As previously discussed, the resource identifier can be a URL that has been embedded in content requested by the client computing device 102 and previously provided by the content provider 104. Alternatively, the resource identifier can also correspond to a CNAME provided by a content provider DNS nameserver in response to a DNS query previously received from the client computing device 102. In either case, the resource identifier includes application information associated with the requested resource. In other embodiments, the resource identifier may also include additional information which can be used by the receiving DNS nameserver in processing the DNS query as further described below.

At decision block 504, a test is conducted to determine whether the current receiving DNS nameserver is authoritative to resolve the DNS query. In one illustrative embodiment, the receiving DNS nameserver can determine whether it is authoritative to resolve the DNS query if there are no CNAME records corresponding to the received resource identifier. For example, the receiving DNS nameserver may maintain one or more CNAMEs that define various application alternatives for request routing processing. In this embodiment, the receiving DNS nameserver utilizes the application information obtained in block 702 to select the appropriate CNAME. As similarly set forth above, in other embodiments, in addition to the application information, the receiving DNS nameserver can utilize additional information or request routing information also provided in the resource identifier to select the appropriate CNAME. Alternatively, the receiving DNS nameserver may select a CNAME by obtaining further application information or additional information based on the resource identifier, but not included in the resource identifier. Accordingly, as previously discussed, the selection of the appropriate CNAME will depend at least in part on the application information processed by the application broker 111, whether obtained directly and/or indirectly from the resource identifier associated with the DNS query. Alternative or additional methodologies may also be practiced to determine whether the DNS nameserver is authoritative.

At decision block 504, if the current receiving DNS nameserver is authoritative (including a determination that the same DNS nameserver will be authoritative for subsequent DNS queries), the current receiving DNS nameserver resolves the DNS query by returning the IP address of an instance of a NCC at block 506. Alternatively, as described above, the IP address can correspond to a hardware/software selection component (such as a load balancer) at a specific NCC POP for selecting a specific instance of a NCC. In either case, the receiving DNS nameserver selects an IP address as a function of the application information obtained directly and/or indirectly from the resource identifier associated with the DNS query. Additionally, as discussed above, the receiving DNS nameserver can identify an IP address to resolve the DNS query by also utilizing additional information or request routing information obtained from the resource identifier associated with the DNS query or otherwise obtained.

Alternatively, if at decision block 504 the receiving DNS nameserver component is not authoritative, at block 508, the DNS nameserver component selects and transmits an alternative resource identifier. As described above, the DNS nameserver component can utilize a data store to identify an appropriate CNAME as a function of the current DNS query, including at least in part the application information in the DNS portion of the URL or CNAME. Additionally, the DNS nameserver component can also implement additional logical processing to select from a set of potential CNAMES. At block 510, different DNS nameserver components of a network computing provider 107 receive a DNS query corresponding to the CNAME. The routine 500 then returns to decision block 504 and continues to repeat as appropriate.

Accordingly, in the routine 500, the receiving DNS nameserver selects either an IP address of a NCC or a CNAME, at least in part, as a function of application information provided in a DNS portion of the resource identifier associated with the DNS query. As an example, the application information in the DNS portion of the resource identifier can specify information associated with the file type of the requested resource, an application type, or specific instance of an application for processing the requested resource. As further set forth above, a number of other factors may additionally be taken into consideration for selecting the appropriate NCC or CNAME for further servicing the resource request.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for processing resource requests comprising:
a DNS nameserver component associated with an application broker, wherein the DNS nameserver component receives a DNS query from a client computing device, wherein the DNS query corresponds to a requested resource associated with a first resource identifier including application information regarding the requested resource, wherein the application broker manages content processing on behalf of a content provider, wherein the first resource identifier further includes information identifying the application broker, and wherein the DNS nameserver component includes one or more computing devices and is operable to:
   parse the first resource identifier so as to obtain the application information regarding the requested resource;
   obtain a second resource identifier based at least in part on a portion of the application information parsed from the first resource identifier, wherein the second resource identifier resolves to one of:
      a domain of a network computing provider selected as a function of a location associated with the client computing device if a ratio of data received by an application for processing the requested resource to data delivered out of the application exceeds a first threshold, wherein the network computing provider is different from the application broker;
      a domain of a network computing provider selected as a function of a location associated with the client computing device if a ratio of a measure of resource utilization to data received by the application from a source exceeds a second threshold, wherein the network computing provider is different from the application broker; and
      a domain of a network computing provider selected as a function of a location associated with a storage component maintaining the requested resource if a ratio of a measure of resource utilization to data received by the application from a source fails to exceed a third threshold, wherein the network computing provider is different from the application broker; and
   transmit the second resource identifier to the client computing device.

2. The system as recited in claim 1 further comprising:
a second DNS nameserver component that receives, from the client computing device, a subsequent DNS query corresponding to the second resource identifier provided by the application broker, wherein the second DNS nameserver component corresponds to a network computing provider, and wherein the second DNS nameserver component is operable to:
   resolve the subsequent DNS query, at the second DNS server, to identify an IP address corresponding to a network computing component for processing and providing content associated with the original resource request; and
   transmit the IP address corresponding to the network computing component to the client computing device.

3. The system as recited in claim 2, wherein the second resource identifier includes additional routing criteria different from the first resource identifier, wherein the additional routing criteria includes at least one of service level routing criteria, geographic routing criteria, network performance routing criteria, financial cost routing criteria, resource popularity information, observed behavior, and content provider specified routing criteria.

4. The system as recited in claim 3, wherein the second DNS nameserver is further operable to parse the second resource identifier so as to obtain the additional routing criteria regarding the requested resource, wherein the second DNS nameserver resolves the subsequent DNS query to identify an IP address corresponding to a network computing component as a function of the parsed additional routing criteria.

5. The system as recited in claim 1, wherein the first resource identifier includes a first portion with DNS information and a second portion with path information.

6. The system as recited in claim 5, wherein the first portion of the first resource identifier includes the application information.

7. The system as recited in claim 1, wherein the DNS nameserver component obtains the second resource identifier additionally based on at least one of service level routing criteria, geographic routing criteria, network performance routing criteria, financial cost routing criteria, resource popularity information, observed behavior, and content provider specified routing criteria.

8. The system as recited in claim 7, wherein network performance routing criteria includes network data transfer latencies.

9. The system as recited in claim 1, wherein the first and second resource identifiers are Uniform Resource Locators (URLs).

10. A method for request routing comprising:
obtaining a DNS query from a client computing device at a DNS server, wherein the DNS query corresponds to a requested resource associated with a first resource identifier, wherein the DNS server corresponds to an application broker, and wherein the first resource identifier includes information identifying the application broker;
determining that the first resource identifier is associated with an alternative resource identifier as a function of application information regarding the requested resource, wherein the application information is included in the first resource identifier; and
transmitting the alternative resource identifier to the client computing device, wherein the alternative resource identifier includes information for causing a DNS query to resolve to a domain corresponding to a network computing provider and supplemental request routing information not included in the first resource identifier.

11. The method of claim 10 further comprising:
obtaining a subsequent DNS query from the client computing device at a second DNS server, wherein the subsequent DNS query corresponds to the alternative resource identifier provided by the application broker and wherein the second DNS server corresponds to the network computing provider;
resolving the subsequent DNS query, at the second DNS server, to identify a network computing component for processing and providing content associated with the original resource request; and
transmitting information identifying the network computing component to the client computing device.

12. The method as recited in claim 11, wherein resolving the subsequent DNS query to identify a network computing component comprises identifying an IP address of a network computing component as a function of the supplemental request routing information included in the alternative resource identifier.

13. The method as recited in claim 12, wherein the supplemental request routing information includes one of service level routing criteria, geographic routing criteria, network performance routing criteria, financial cost routing criteria, observed behavior, and content provider specified routing criteria.

14. The method as recited in claim 10, wherein first resource identifier corresponds to a uniform resource locator such that the DNS query resolves to a domain corresponding to the network computing provider.

15. The method as recited in claim 10, wherein the alternative resource identifier corresponds to a canonical name record identifier.

16. The method as recited in claim 10, wherein the network computing component comprises an application for processing the requested resource.

17. The method as recited in claim 10, wherein the network computing component is operable to dynamically cause the creation of an instance of a virtual machine for processing the requested resource.

18. The method as recited in claim 10, wherein the application information includes information associated with a file type of the requested resource.

19. The method as recited in claim 10, wherein the application information includes information associated with a type of application for processing the requested resource.

20. The method as recited in claim 10, wherein the application information includes information identifying an instance of an application for processing the requested resource.

21. The method as recited in claim 10 further comprising obtaining, at the DNS server, information corresponding to the client computing device associated with the DNS query, wherein the information corresponding to the client computing device is associated with a geographic location of the client computing device and wherein selecting an alternative resource identifier is further based on information associated with a geographic location of the client computing device.

22. The method as recited in claim 10 further comprising determining, at the DNS server, information corresponding to a storage location of the requested resource associated with the DNS query, wherein selecting an alternative resource identifier is further based on information associated with the storage location of the requested resource.

23. The method as recited in claim 10 further comprising determining, at the DNS server, information corresponding to latency information associated with the DNS query, wherein selecting an alternative resource identifier is further based on the latency information.

24. The method as recited in claim 10, wherein the alternative resource identifier resolves to a domain of a network computing provider selected as a function of a location associated with the client computing device if a ratio of data received by an application for processing the requested resource to data delivered out of the application exceeds a first threshold.

25. The method as recited in claim 10, wherein the alternative resource identifier resolves to a domain of a network computing provider selected as a function of a location associated with the client computing device if a ratio of a measure of resource utilization to data received by the application from a source exceeds a second threshold.

26. The method as recited in claim 10, wherein the alternative resource identifier resolves to a domain of a network computing provider selected as a function of a location associated with a storage component maintaining the requested resource if a ratio of a measure of resource utilization to data received by the application from a source fails to exceed a third threshold.

27. A method for request routing comprising:
obtaining a DNS query from a client computing device at a DNS server, wherein the DNS query corresponds to a requested resource associated with a first resource identifier, wherein the DNS server corresponds to an application broker, and wherein the first resource identifier includes information identifying the application broker;

selecting a network computing component for processing the requested resource from a plurality of network computing components based on application information included in the first resource identifier; and transmitting information identifying the selected network computing component from the DNS server to the client computing device.

28. The method as recited in claim 27, wherein the network computing component comprises an application for processing the requested resource.

29. The method as recited in claim 27, wherein the network computing component is operable to dynamically cause the creation of an instance of a virtual machine for processing the requested resource.

30. The method as recited in claim 27, wherein the application information comprises identification of a file type of the requested resource and wherein a network computing component is selected at the DNS server based on the file type.

31. The method as recited in claim 27, wherein the application information comprises identification of a type of application for processing the requested resource and wherein a network computing component is selected at the DNS server based on the application type.

32. The method as recited in claim 27, wherein the application information includes identification of an instance of an application for processing the requested resource and wherein a network computing component is selected at the DNS server based on the application instance.

33. The method as recited in claim 27 further comprising determining, at the DNS server, additional information for selecting the network computing component, wherein the additional information includes at least one of service level routing criteria, geographic routing criteria, network performance routing criteria, financial cost routing criteria, observed behavior, and content provider specified routing criteria.

34. The method as recited in claim 27 further comprising obtaining, at the DNS server, information corresponding to the client computing device associated with the DNS query, wherein the information corresponding to the client computing device is associated with a geographic location of the client computing device and wherein selecting a network computing component is further based on information associated with a geographic location of the client computing device.

35. The method as recited in claim 27 further comprising determining, at the DNS server, information corresponding to a storage location of the requested resource associated with the DNS query, wherein selecting a network computing component is further based on information associated with the storage location of the requested resource.

36. The method as recited in claim 27, wherein the network computing component is further selected as a function of a location associated with the client computing device if a ratio of data received by an application for processing the requested resource to data delivered out of the application exceeds a first threshold.

37. The method as recited in claim 27, wherein the network computing component is further selected as a function of a location associated with the client computing device if a ratio of a measure of resource utilization to data received by the application from a source exceeds a second threshold.

38. The method as recited in claim 27, wherein the network computing component is further selected as a function of a location associated with a storage component maintaining the requested resource if a ratio of a measure of resource utilization to data received by the application from a source fails to exceed a third threshold.

* * * * *